United States Patent [19]
Korner et al.

[11] 3,937,109
[45] Feb. 10, 1976

[54] METHOD OF MANUFACTURING CUTTING AND/OR CREASING DIE

[75] Inventors: Siegfried Korner; Wolfgang Meurer; Harald Knofel; Dieter Prochazka; Rudi Hirche, all of Dresden, Germany

[73] Assignee: VEB Polygraph Leipzig Kombinat fur Polygraphische Maschinen und Ausrustungen, Leipzig, Germany

[22] Filed: Dec. 18, 1974

[21] Appl. No.: 534,350

[30] Foreign Application Priority Data
Jan. 2, 1974  Germany............................ 2617576

[52] U.S. Cl.................. 76/107 C; 29/407; 29/513; 83/669; 93/58.2 R
[51] Int. Cl.²......................................... B21K 5/20
[58] Field of Search..... 29/513 X, 407 X; 76/107 C; 93/58.2 X; 83/698, 669 X, 670

[56] References Cited
UNITED STATES PATENTS

| | | | |
|---|---|---|---|
| 1,385,483 | 7/1921 | Carter | 29/513 X |
| 1,737,553 | 12/1929 | Andrews | 93/58.2 R |
| 1,893,472 | 1/1933 | Horton | 29/513 UX |
| 2,673,390 | 3/1954 | Broberg | 52/758 D X |
| 2,800,374 | 7/1957 | Ernst | 29/513 X |
| 2,863,337 | 12/1958 | Ackly | 83/698 UX |
| 3,052,139 | 9/1962 | Trimble | 76/107 C |
| 3,177,561 | 4/1965 | Oeler et al. | 29/513 X |
| 3,198,093 | 8/1965 | Kirby et al. | 93/58.2 R |
| 3,260,159 | 7/1966 | Doney | 83/669 X |
| 3,322,004 | 5/1967 | Wolfe | 76/107 C |

Primary Examiner—Charlie T. Moon
Attorney, Agent, or Firm—Michael J. Striker

[57] ABSTRACT

A cutting and/or creasing die includes a sheet which is to be bent around and attached to a roller of a rotary machine for producing blanks from a strip of material, particularly for producing creased blanks for boxes from cardboard or similar material. The method of the invention includes forming the sheet with a plurality of tongues bent out of the general plane of the sheet to the side thereof which will face away from the roller when in operation, and laterally of the lines which indicate the desired positions of a plurality of cutting and/or creasing blades. The blades have lateral projections and, after they have been positioned along the lines, the tongues are bent into forced contact with the lateral projections of the blades, thus attaching the latter to the sheet. The blades may be bonded to the sheet prior to the bending of the tongues. Finally, the sheet with the blades attached thereto is mounted on the roller.

5 Claims, 9 Drawing Figures

METHOD OF MANUFACTURING CUTTING AND/OR CREASING DIE

BACKGROUND OF THE INVENTION

The present invention relates to a method of producing a creasing and/or cutting die, and to a die manufactured by this method.

The invention is particularly concerned with a creasing and/or cutting die which may be slipped over and attached to an outer circumferential surface of a roller of a creasing and cutting machine which produces blanks from cardboard or similar material, which may later be folded along the creases to form a wrapping box or a similar container.

There are already known various dies for accomplishing this task, that is dies which are preferably planar when they are manufactured but which are subsequently bent to conform to the outer circumferential surface of the roller, and then slipped over such surface and attached to such roller so as to share its rotating movement. Generally speaking, such a die includes a relatively thin metal or similar sheet or foil, and is provided on its major surface which will face away from the outer circumferential surface of the roller when the die is mounted thereon, with a plurality of cutting or creasing edges or blades which are adapted to contact an advancing strip of cardboard or similar material and either cut a blank out of the strip, or crease the blank, or both. Either a counter-die is mounted on a counter-roller and cooperates with the die during the cutting and/or creasing operation or the die cooperates directly with the counter-roller. There are also already known various methods for producing such dies and counter-dies.

Before discussing the various methods of producing the dies, and the dies produced by these methods and their advantages and drawbacks, it should be mentioned that the various cutting and/or creasing blades are positioned on their base in accordance with a special system of coordinates, according to markings provided on the base or directly in conformity with the drawing of the blank to be produced during the cutting and creasing operation which is transferred or projected on the major surface of the base. A reducing coefficient must be taken into consideration for the lines which extend in the direction of rotation for the die when mounted on the respective roller to compensate for the deformation of the base and of the blades when bent around the roller.

In one conventional method of producing dies, the die and the counter-die are formed as relatively thin steel plates which are provided with flat webs in a photomechanical etching process. The webs have flat engaging surfaces which, when the dies are mounted on their respective rollers and rotate therewith, contact the exposed major surfaces or the strip material to be severed or creased. These flat surfaces extend parallel to the exposed surfaces of the material in the region of contact therewith, and the associated flat surfaces of the die and counter-die are offset with respect to one another with partial overlapping, so that they exert forces on the material to be cut or creased, which forces result in a squeezing deformation of the material in the vicinity of the respective associated flat surfaces of the webs which, in an extreme situation, results in ripping off of the useless material and production of the useful blank.

However, experience with this kind of dies and counter-dies has shown that they are disadvantageous in various respects. First of all, it will be appreciated that, as a result of the provision of the flat webs having the flat engaging surfaces which are offset with respect to one another on the die and the counter-die, respectively, and particularly as a result of the fact that the flat surfaces are so arranged that they never come into contact with one another, the material cannot be severed along an accurate cutting line as would be the case if the material were cut with a different cutting tool which would be provided with a sharp cutting edge cooperating with a hard counter-surface. Rather, the material is only squeezed between the flat surfaces of the die and the counter-die which results in many materials in uneven peripheral edges of the so-produced blank. Furthermore, the production of such dies and counter-dies requires the availability of a special equipment capable of producing such dies and counter-dies in a very precise manner and with only minute tolerance deviations from the desired shape of the webs and the flat surfaces thereof, such a special equipment not always being available to the user of the cutting and creasing machine. This, of course, is very disadvantageous since, whenever a new production line is to be initiated, the new die and counter-die must be ordered from a supplier, which results in unnecessary delays. Such problems are also encountered when worn-out dies and counter-dies are to be replaced. Also, the photomechanical process of producing such dies is relatively expensive, which contributes to a relatively high cost of the dies and the counter-dies. Another drawback of such a method of producing dies resides in the fact that the webs with their flat surfaces are integral with the die substrata so that, when only some of the webs are worn out or damaged, it is impossible, or possible only with an excessive effort and a high cost, to replace the worn-out or damaged webs with new ones. Thus, in many instances, it is less expensive to replace the entire die or counter-die, rather than to attempt to repair the same which, of course, reduces the useful life of the die.

There are also already known different creasing and/or cutting dies in which the die again includes a relatively thin metal sheet, and wherein pins are connected to such a sheet, for instance, by spot welding. Cutting and creasing blades, which are curved to conform to the shape of the metal sheet when connected to the respective roller, are then connected to and/or clamped by the pins and thus attached to the metal sheet. Such dies are not only known from the packaging industry, but find their most advantageous use particularly in the machines for punching and cutting metal, particularly steel, strips.

In such dies, where the cutting or creasing blades are clamped by the pins and where the dies rotate together with the respective rollers, other disadvantages are present. So, for example, since the pins have to be connected to the metal sheet, for instance, by spot welding, the dimensions thereof cannot be miniaturized below a certain level, particularly since the pins must be sufficiently rigid and be securely connected both to the metal sheet and the cutting or creasing blade mounted thereon. This, in turn, results in the need to make the cutting or creasing blades relatively high in order to extend to a sufficient extent radially outwardly beyond the pins. However, because of the relatively large dimensions of the blades, and particularly because of the relatively large height thereof, the blades are often prefabricated so as to have a curved configuration in their longitudinal direction before they are mounted on the metal sheet. This is necessary because of the fact that the relatively large dimensions of the blades result in their high resistance to bending, so that it is all but impossible to mount the blades on the sheet as long as it is still planar, and then bend the sheet with the blades mounted thereon. Thus, the usual method of assembling such a die is to mount the metal sheet with the pins thereon on the respective roller, and only then to connect the respective blades to the proper pins. Since the assembling of the die is accomplished directly on the roller, it requires that the creasing and cutting machine be put out of operation for an extended period of time which, of course, is very disadvantageous.

However, the production of the spatially curved blades is a difficult and time-consuming task. This is caused by the fact that the blades are relatively high, so that they not only have a high resistance to bending, but also there exists the danger that undesirable deformations of the blades, particularly out of their general planes, will occur during the bending operation; thus, the blades will more often than not extend only approximately radially outwardly of the die and thus of the roller, which adversely affects the accurate operation of the creasing or cutting machine. As a result of this inaccuracy, the roller with the die thereon may not be dynamically balanced, and the products obtained during the cutting or creasing operation may be of less than desired configurations and appearances.

On the other hand, it is possible in this arrangement to simply replace blades which are worn-out or damaged beyond repair, even though only while the machine is in standstill. When some of the blades are only partially worn out or damaged, it is desirable to lift the metal sheet in the region of such wearing-out or damage in order to be able to continue the operation of the machine with the same die so long as it is still usable. This is usually done by putting inserts between the roller and the metal sheet in such a region. However, in this particular arrangement, such extension of the useful life of the partially damaged or worn out die is all but impossible because of the high resistance of the blades to bending. Thus, the utilization of this arrangement is very limited. Other disadvantages of this arrangement are that, when the pins are to be distributed on the metal sheet and welded thereto in an automatic welding machine using a control program for controlling the operation of the automatic welding machine, the program as well as the welding machine must be very precise which increases the expenditure in connection with the production of such a die, and that it is impossible to visually supervise the exact position of the blades during the assembling operation and afterwards. The advantage of this die, which cooperates with a counter-roller so that the material to be cut and/or creased passes between the die and the counter-roller, is that the severing lines of the blank are rather accurate and the appearance of the blank better than when the previously discussed dies are used.

Other dies may also be used, the blades of which basically resemble those used in reciprocating presses for cutting blanks out of steel or other metallic strips. Such blades are in this case embedded in or otherwise connected to initially curved shells made of wood, metal or a synthetic plastic material, which shells are then assembled on and connected to the respective roller so as to share the rotation thereof. In such an arrangement, the blades operate similarly as discussed in connection with the previous prior art, that is they cooperate either with a counter-roller or with a flat surface, the material to be severed or creased passing between the shells and the counter-roller or the flat surface.

Similar problems as those discussed in connection with the previously mentioned arrangement are also encountered in the die according to this embodiment where the blades are accommodated in and connected to the curved shells of metal, wood or synthetic plastic material. Even in this arrangement, the assembling of the dies must be performed in two phases, the first phase involving the connection of the base plate — that is of the shells — to the roller, and the other phase involving pressing the blades into the base plate. This base plate is usually formed with prefabricated grooves into which the blades are pressed, and the accuracy of the positions of the blades will to a large extent depend on the accuracy with which the receiving grooves have been prefabricated in the base plate. However, very often it is impossible to prefabricate exact grooves in the curved base plate, so that it cannot be assured that the actual positions of the blades will conform to the desired positions thereof. Furthermore, since the engagement of the blades with the grooves is not secure enough, it is necessary to provide additional attachment elements extending, for instance, through perforations in the sides of the blades, which then secure the blades to the base plate and prevent their displacement out of the respective grooves. As discussed above in connection with the previous arrangement, the adjustment of the positions of the worn-out or damaged blades is also very difficult if not impossible.

There are also already known different dies for use in creasing and cutting machines of the type employing rotating rollers between which the material, such as cardboard, passes to be treated, which dies utilize blades which are generally triangular in cross-section and which are connected to the metal sheet or other base by brazing, soldering, glueing or attaching by screws or similar connectors. The roller which is equipped with such a die can cooperate with a counter-roller in a conventional manner. The material to be treated enters the gap between the die and the counter-roller and thus is pressed against the counter-roller and severed, embossed, creased or the like by the exposed working edges of the triangular blades. In the event that the blades which may be of various shapes are directly connected to a base by spot-welding, brazing or soldering, the heat transmitted to the base during such operations results in deformation of the base owing to the non-uniform thermal treatment of the base and thus the generation of local stresses. During the operation of the machine, relatively high forces alternatingly act on the blades, which may result in the destruction of the connection between the blades and the base, particularly when such a connection is obtained by spot welding. In order to obtain rotational symmetry of the die and particularly of the cutting edges of the blades, it is necessary to adjust the positions of the blades with respect to the base or to perform other finishing operations. However, since the base itself has been deformed during the soldering, brazing or spot-welding operation, the time and labor expenditure for such a finishing operation is excessive. A particular disadvantage of the dies which are manufactured according to this method is that the damaged or worn-out blades can be replaced only with difficulty and at high cost.

In the event that the creasing or cutting blades are connected to the base by glueing, the main disadvantage of this method of producing the die is that the glued connection has relatively low resistance to the forces which act on the blades during the operation of the machine, so that the glued connection will disintegrate within a relatively short period of time. More particularly, the layer of the glue, adhesive, or other bonding agent dissociates itself either from the base or the blade and peels off. This, of course, reduces the useful life of the die.

A further modification of the just-described die which suffers of the same drawbacks as discussed above is that the base is a transparent foil. Blades, which are substantially triangular in cross-section, are bonded to the foil. It is possible to attach the foil to the roller first, and in this case the blades are curved so as to substantially correspond to the outer curvature of the foil mounted on the roller, and then positioned thereon and bonded thereto. Alternatively, the blades may be straight and be bonded to the foil in its planar state, and then the foil may be bent together with the blades bonded thereto so as to conform to the circumferential surface of the roller and be attached thereto. The operation of this die is the same as previously discussed, and the danger of disintegration or peeling-off of the bonded connection is still present.

Finally, there is also already known a method of producing the die in which the creasing or cutting blades, each of which is formed with an angularly bent foot, are directly connected to a metal sheet jacket which is subsequently driven into rotation during the cutting or creasing operation. In this method, the blades must be positioned on the jacket in accordance with a marking on the jacket or in accordance with a drawing, which is very time-consuming and, moreover, which is very inaccurate so that the blades are connected to the jacket in positions which to a greater or lesser degree deviate from the desired positions. This, in turn, means that the shapes of the thus-produced blanks will deviate from the desired shapes, which is particularly disadvantageous if the blanks are to be used for producing boxes or packages in an automatic packaging machine.

It may be seen from the above discussion of the prior art dies and methods of producing dies that no method of producing dies is known at present which renders possible the formation of the die in a plane, that is in its developed form, and its subsequent bending around the roller and attachment of the same thereto, which die would also achieve satisfactory results in terms of the preciseness of the severing and/or folding lines on the blanks.

SUMMARY OF THE INVENTION

Accordingly, it is a general object of the present invention to avoid the disadvantages of the prior art.

More particularly, it is an object of the present invention to provide a die for use in a rotary creasing and/or cutting machine which is not possessed of the drawbacks of the prior-art dies.

It is a further object of the present invention to provide a die which consists of a sheet which is bent around a roller of such a machine, and of a plurality of blades attached to the sheet, in which the danger of unintentioned dissociation of the blades from the sheet is eliminated.

It is still a further object of the present invention to provide a die which has a high degree of rotational symmetry and which is capable of producing blanks of precise dimensions.

It is yet another object of the present invention to provide a die which is inexpensive to manufacture but reliable nevertheless.

Another object of the present invention is to provide a die which may be positioned on and removed from the roller as often as desired.

A concomitant object of the present invention is to provide a method for producing such a die which enables the positioning of the blades on, and their connection to, the sheet when the latter is developed into a plane, and an easy bending thereof to conform to the shape of the roller to which it is to be attached without destroying the connection between the blades and the sheet.

An additional object of the present invention is to provide a method for producing cutting and/or creasing dies in which the positioning of the blades on the sheet may be visually supervised.

In pursuance with these objects and others which will become apparent hereafter, one embodiment of the present invention resides in a method for producing dies for use in rotary creasing and/or cutting machines which includes the steps of bending tongues out of the general plane of the sheet laterally of the desired positions of the creasing and/or cutting blades while the sheet is developed into a plane, positioning the blades between the respective tongues, bending the tongues into forced contact with the blades with attendant attachment of the blades to the sheet, and subsequent bending of the sheet with the blades attached thereto around the roller and the attachment of the former to the latter.

The die according to the invention is composed of the sheet from which the tongues are bent out, and of the blades which have in their regions adjacent to the sheet lateral portions extending parallel to the sheet, around which the tongues are bent so as to attach the blades to the sheet. An adhesive layer or strip may be interposed between the respective blade and the sheet, which preliminarily connects such blade to the sheet prior to the bending of the tongues into forced contact with the lateral portions of the blade.

The positioning of the blades on the sheet, and the provision of the tongues, are greatly facilitated when a plurality of lines indicative of the desired positions of the respective blades and tongues is copies on the sheet in a photochemical manner while the sheet has a planar configuration.

The novel features which are considered as characteristic for the invention are set forth in particular in the appended claims. The invention itself however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The present invention will now be discussed in some detail with reference to the accompanying drawings. However, first of all, some of the expedients not readily ascertainable from the drawings will be discussed.

The manufacture of the die is based on the drawing which depicts the blank to be produced, that is the outer contour thereof along which it is to be severed from the rest of the material passing through the rotary creasing and cutting machine, and the folding lines along which the blank is subsequently folded to form a wrapping box or a similar container. Of course, the blank will be substantially planar after leaving the machine, while the die when mounted in the rotary machine is curved to conform to the curvature of the rotating roller on which it is mounted for rotation therewith. Therefore, it is necessary to take into consideration the fact that the die will be assembled in its planar position but that it will be subsequently bent, when preparing the image of the blank which is to be transferred onto a major surface of a sheet which constitutes the support portion of the die so that, when cutting and/or creasing blades are connected to the sheet and also bent therewith, the dimensions of the blank as actually severed and/or embossed during the rotation of the roller correspond to the desired dimensions. In other words, when preparing the image of the blank to be produced, the dimensions of the image which will extend in the direction of rotation of the roller when the die is mounted thereon, must be multiplied by a reducing factor when preparing the image of the blank. Of course, it is also possible to obtain such an image automatically when an automatic drafting mechanism is used which is connected to a computer which recalculates the respective dimensions and controls the drafting mechanism accordingly. Another possibility is to prepare the image of the blank using conventional optical methods resulting in appropriately reducing the distortion of the image of the blank in the desired direction. The image may be then photographed and one or more slides may be prepared.

Figure 1:
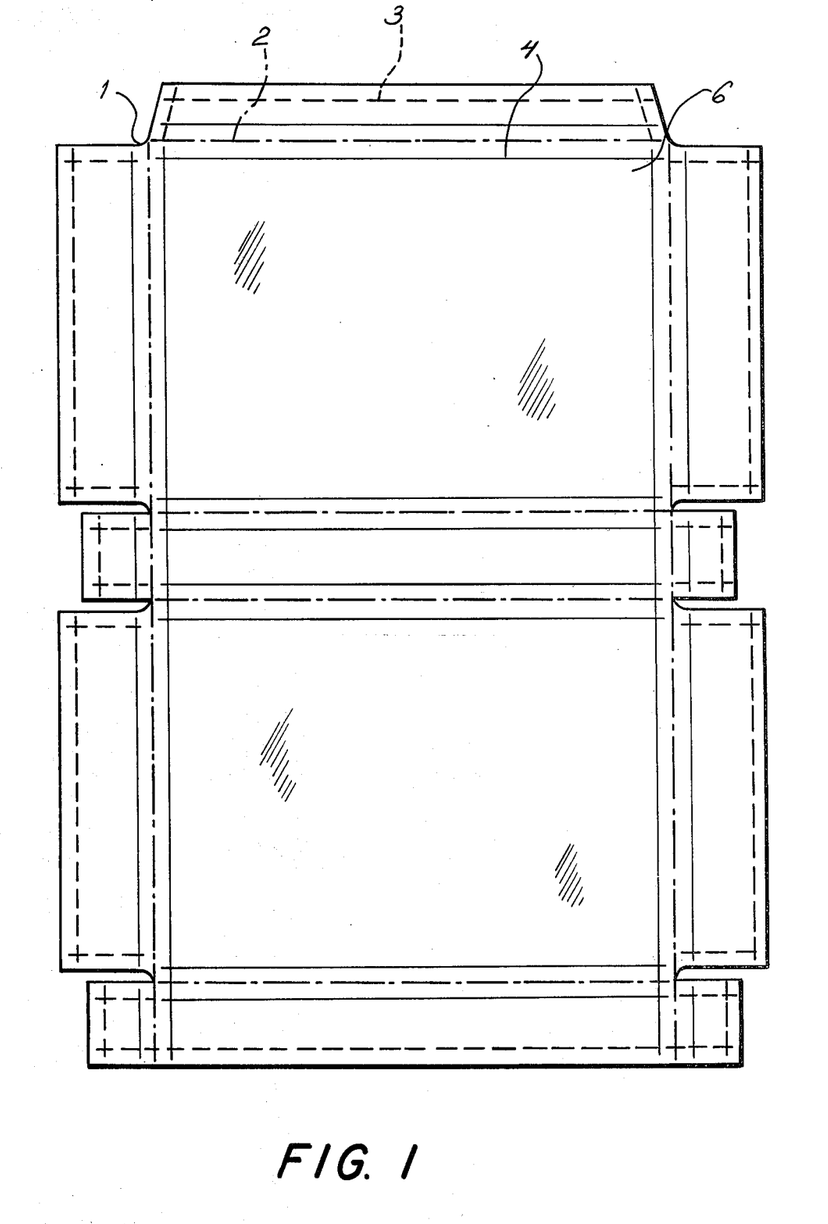
FIG. 1 is a top-plan view of an example of an image to be transferred onto a sheet and having dimensions substantially corresponding to those of the blank to be produced.

FIG. 1 illustrates an image of an example of a blank to be produced in a rotary creasing and cutting machine utilizing a die according to the present invention. It may be seen that this image includes a plurality of cutting blade positioning lines 1, and of creasing blade positioning lines 2. In addition thereto, a plurality of cutting blade auxiliary lines 3 and of creasing blade auxiliary lines 4 extends adjacent to the lines 1 and 2 and parallel thereto. The purpose of the lines 1 to 4 will be discussed later on.

A plate 5, which may be of a metallic material, has a major surface 9 which may be provided with a lightsensitive layer. If such is the case, one or more of the slides which depict the modified images of the blanks to be produced may be distributed on the major surface 9, and the latter may be exposed to light penetrating the slides so that a latent image is formed in the lightsensitive layer. Subsequently thereto, the metallic sheet 5 is further treated in accordance with methods well known, for instance, in the printing industry for producing copied offset plates.

Figure 2:
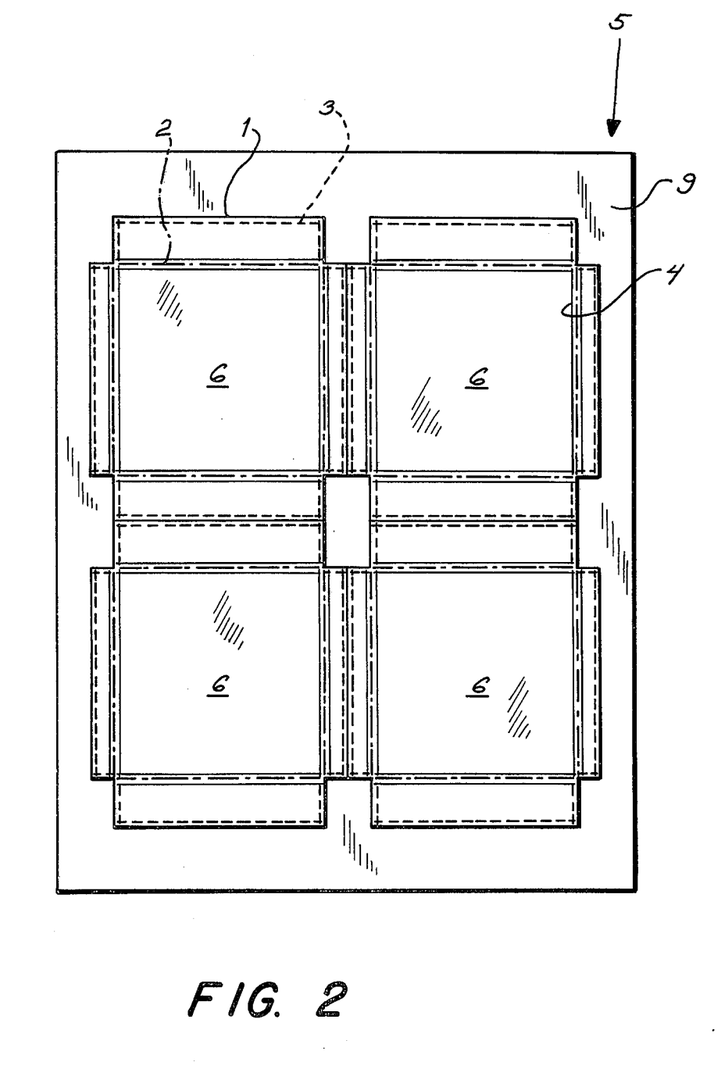
FIG. 2 is a top-plan view of the sheet with a different image transferred thereon.

Coming now to FIG. 2 which depicts the sheet 5 after the latent images have been developed on the major surface 9 thereof or produced in any other conventional manner, the major surface 9 in this embodiment being provided with four adjacent images arranged in their correct positions with respect to the plate 5. The cutting blade positioning lines 1 define on the major surface 9 of the sheet 5 a blank image 6 which substantially — except for the reducing factor — corresponds to the configuration of the blank.

Figure 3:
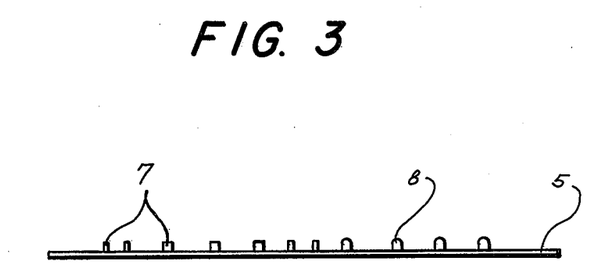
FIG. 3 is a front-elevational view of the sheet with some of the tongues bent out of the general plane of the sheet.
Figure 4:
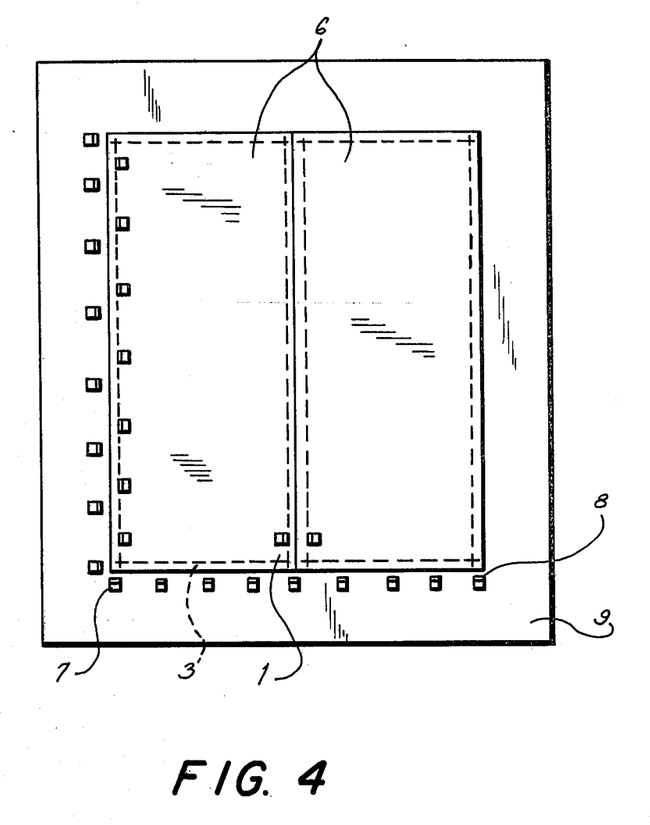
FIG. 4 is a top-plan view of the sheet of FIG. 3 and having a still different image transferred thereon.

FIGS. 3 and 4 illustrate two views of a sheet 5 which is provided on its major surface 9 with different images 6. A plurality of rectangular tongues 7 and substantially semi-circular tongues 8 is bent out of the general plane of the sheet 5 and to the side thereof on which it is provided with the images 6. The tongues 7 and 8 are bent by means of a conventional punching machine, and in the illustrated positions they extend substantially normal to the surface 9 of the sheet 5. The tongues 7 and 8 are distributed along the cutting blade positioning lines 1 and similarly also along the creasing blade positioning lines 2 which have not been illustrated in FIG. 3 for the sake of clarity. In the currently preferred embodiment of the invention, the distance of the tongues 7 and 8 from the cutting blade positioning lines 1 and from the creasing blade positioning lines 2 substantially corresponds to the distance of the cutting blade auxiliary lines 3 and creasing line auxiliary lines from the lines 1 and 2, respectively. Thus, the auxiliary lines 3 and 4 serve as visual guides during the punching-out of the tongues 7 and 8.

Figure 5:
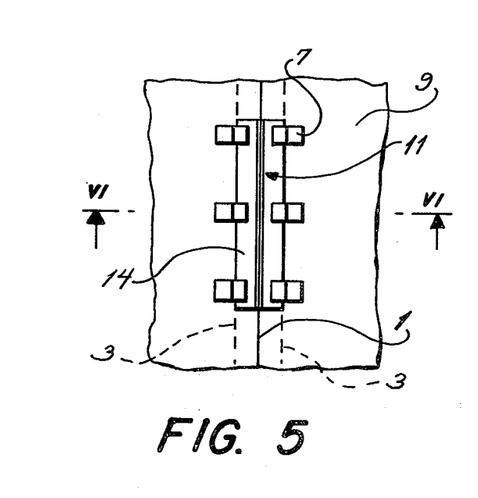
FIG. 5 is a top-plan view of a portion of the sheet with a cutting blade connected thereto.
Figure 6:
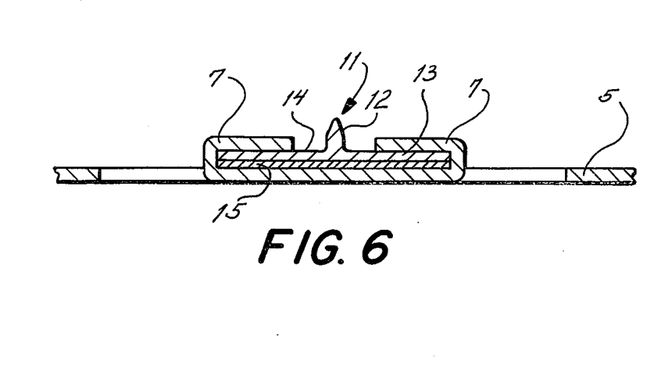
FIG. 6 is an enlarged cross-sectional view taken on line VI—VI of FIG. 5.
Figure 7:
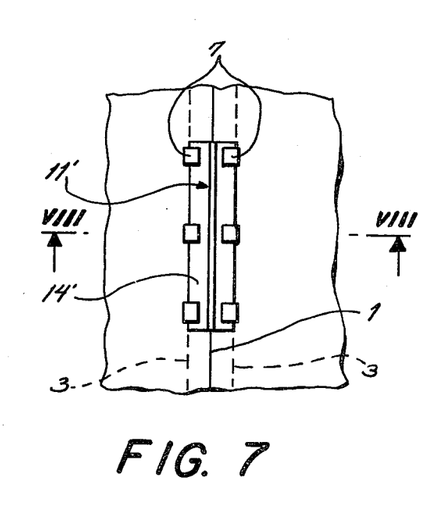
FIG. 7 is a top-plan view of a portion of the sheet with a cutting blade connected thereto in a different manner.
Figure 8:
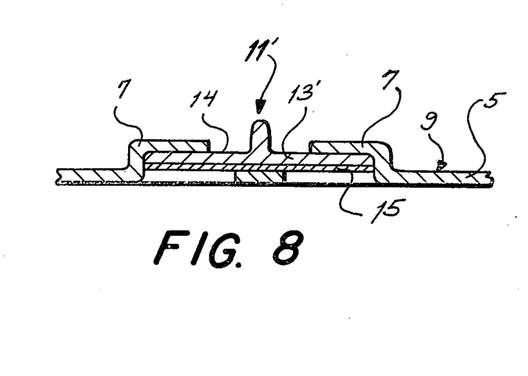
FIG. 8 is an enlarged cross-sectional view taken on line VIII—VIII of FIG. 7.

After the tongues 7 and 8 are punched out or similarly produced, elongated cutting blades 11 and/or creasing blades 11' are positioned on the sheet 5 so that their respective longitudinal axes extend parallel to the positioning lines 1 and 2, respectively and that the tongues 7 and 8 are located laterally of the respective blades 11 and 11'. One of the cutting blades 11 is illustrated in FIGS. 5 and 6 as formed with a central cutting portion 12 and two laterally projecting portions 13 having upper surfaces 14. FIGS. 7 and 8, on the other hand, illustrate one of the creasing blades 11' which is provided with a central creasing portion 12' and two portions 13' which project laterally of the creasing portion 12' and have upper surfaces 14'. Thus, the blades 11 and 11' are similar in construction except for the fact that the cutting portion 12 has a sharp edge, while the edge of the creasing portion 12' is rounded. FIGS. 5 to 8 further illustrate two possibilities of providing the tongues 7. Thus, in the embodiment of FIGS. 5 and 6 the tongues 7 are provided on the other side of the auxiliary line 3 or 4 than the blade 11 or 11', while the tongues 7 of the embodiment of FIGS. 7 and 8 are located to the same side.

As seen in FIGS. 5 to 8, once the blades 11 and 11' are positioned on the sheet 5 between the tongues 7, the latter are bent in a conventional manner around the lateral portions 13 or 13' until they contact and press against the surfaces 14 and 14' respectively. In this manner, the respective blades 11 and 11' are securely connected to the sheet 5, their portions 12, 12' extending substantially normal to the major surface 9 thereof. In order to facilitate the assembly of the die, and to improve the attachment of the blades 11 and 11' to the sheet 5, a bilaterally adhesive foil 15 may be interposed between the blades 11 and 11' and the surface 9 of the sheet 5 in the region bounded by the auxiliary lines 3 and 4, respectively, which foil 15 adheres to the blades 11 and 11' and to the surface 9 and thus preliminarily connects the blades 11 and 11', being reinforced by the bending of the tongues 7 around the lateral portions 13, 13' of the blades 11 and 11', respectively.

Figure 9:
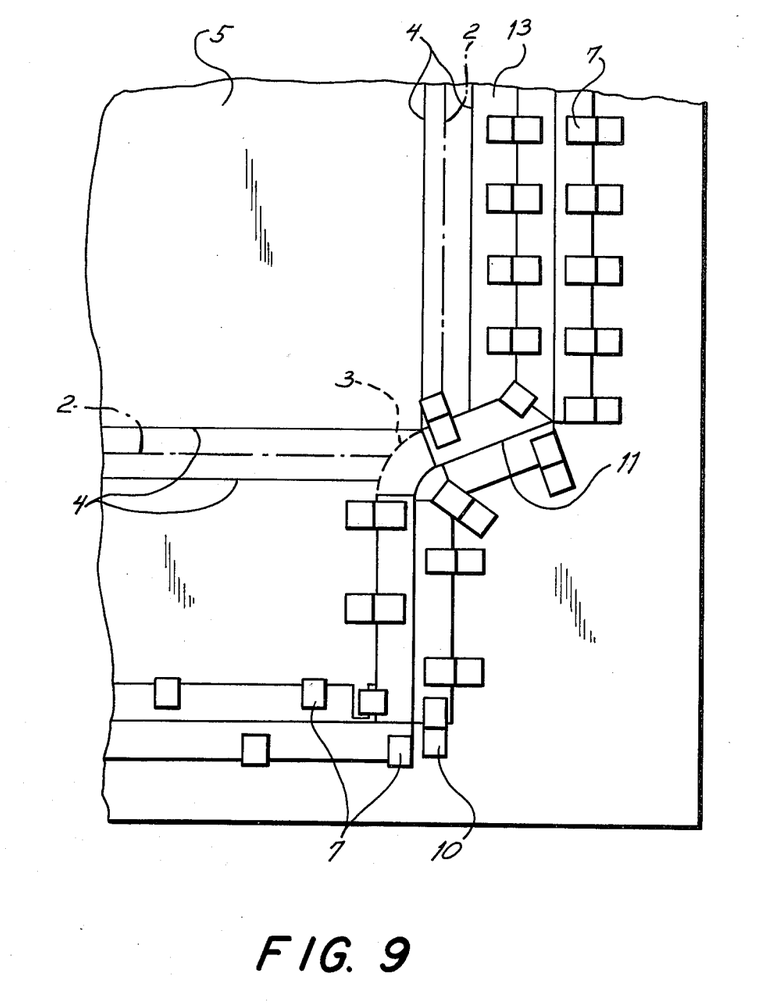
FIG. 9 is a top-plan view of a portion of the sheet, in a region of a corner of the image, with cutting blades connected thereto.

FIG. 9 illustrates a region of the sheet 5 which includes a corner region of the image 6 provided on the surface 9 of the sheet 5. It will be appreciated that special measures must be taken for connecting the blades 11, 11' to the sheet 5 in the region of the corner of the image 6 of the blank or in any other region where the blades 11, 11' meet, particularly if the corner is rounded. Thus, for example, the reference numeral 10 designates an additional tongue which has been produced without resorting to the auxiliary lines 3 and 4. It may also be seen in this Figure that the lateral portions 13 may be cut off in order to be able to assemble the die. It is also possible to provide various other recesses, which have not been illustrated, and which may receive the respective tongues 7. This Figure also illustrates that the tongues 7 may either be located opposite one another across the respective blade 11, or may alternate therealong, or any combination of the opposite and alternating locations.

After the die has been assembled in the above-discussed manner in a plane, it can be bent around, and attached to, the roller of the creasing and cutting machine. This is rendered possible by the facts that the sheet 5 is relatively thin and the blades relatively low, so that the moment of resistance of the die in the direction of bending is also relatively low. Of course, it is possible that, as a result of deviations of the actual dimensions of the sheet 5 and the blades 11 from the ideal ones, the die when attached to the roller will not be completely rotationally symmetrical. In this event, any deviations from the ideal rotationally symmetrical mounting of the die on the roller may be easily compensated for by interposing suitable adhesive foils between the inner major surface of the sheet 5 and the outer circumferential surface of the roller. An advantage of the die according to the invention is that it is easy to locate the region in which the shape of the die deviates from its ideal shape, the tongues 7 serving as reference points.

The worn-out or damaged blades 11 and 11', unless the damage is of such a character that it can be compensated for by interposing additional foils between the sheet 5 and the roller on which it is mounted, can be easily replaced by simply bending the tongues 7 or 8 out of contact with the surfaces 14 and 14', respectively, and into their normal positions with respect to the sheet 5, upon which the damaged blades 11 or 11' may be removed and new blades 11 or 11' put into their places, after which the tongues 7 or 8 are again bent into contact with the surfaces 14 or 14' of the replacement blades 11 or 11'.

When the method according to the present invention is utilized, it is possible to arrange the creasing and cutting blades 11 and 11' on a shared sheet 5 in the same region thereof, or in two separate regions thereof, one for the cutting blades 11 and the other for the creasing blades 11', or to attach the creasing blades 11' to a different sheet 5 than the cutting blades 11. In the latter two instances, the creasing and cutting operations are performed in succession, while in the first instance both operations are performed simultaneously.

It will be understood that each of the elements described above, or two or more together, may also find a useful application in other types of dies differing from the types described above. So, for instance, a similar method could be used for attaching blades to a sheet of a die which is to be used in planar condition.

While the invention has been illustrated and described as embodied in a method of manufacturing a cutting and/or creasing die, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

We claim:

1. A method of manufacturing a die, comprising the steps of providing a planar sheet with a plurality of tongues extending substantially normal to a major surface of said sheet; positioning a plurality of blades between respective ones of said tongues so that central projections thereof extend normal to said major surface; and bending said tongues around other portions of said blades so as to attach said blades to said sheet.

2. A method as defined in claim 1, and further comprising a preliminary step of providing blade positioning lines on said major surface; and wherein said step of providing said tongues includes forming the same along said blade positioning lines in spaced relation with respect to one another.

3. A method as defined in claim 2, wherein said preliminary step includes photochemically transferring said blade positioning lines onto said major surface.

4. A method as defined in claim 1, and further comprising the step of adhering bilaterally adherent foils to said major surface in regions bounded by said tongues; and wherein said positioning step includes adhering the respective blades to the respective foils prior to said step of bending.

5. A method as defined in claim 1, and further comprising the step of mounting the completed die on a circumferential surface of a roller of a creasing and cutting machine subsequently to said bending step.

* * * * *